United States Patent [19]

Koga et al.

[11] 3,878,183

[45] Apr. 15, 1975

[54] FIBROUS POLYOLEFIN PARTICLES AND PRODUCTION THEREOF

[75] Inventors: Michio Koga; Masaki Fujii; Hiroshi Yui, all of Yokkaichi, Japan

[73] Assignee: Mitsubishi Petrochemical Company Limited, Tokyo, Japan

[22] Filed: Dec. 23, 1971

[21] Appl. No.: 211,563

[30] Foreign Application Priority Data
Dec. 28, 1970 Japan.............................. 45-119635

[52] U.S. Cl. ..... 260/94.9 R; 117/100 B; 162/157 R; 162/168; 260/17.4 CL; 260/17.4 R; 260/41 A; 260/41 AG; 260/94.9 B; 260/94.9 DA
[51] Int. Cl. .......................... C08d 3/04; C08d 7/00
[58] Field of Search... 260/94.9 B, 17.4 CL, 17.4 R, 260/41 A, 41 AG; 117/176 AB, 176 AF, 100 A, 100 B

[56] References Cited
UNITED STATES PATENTS

| | | | |
|---|---|---|---|
| 2,919,267 | 12/1959 | Juveland et al. | 260/94.9 |
| 2,939,846 | 6/1960 | Gordon et al. | 260/94.9 |
| 3,008,943 | 11/1961 | Guyer | 260/94.9 |
| 3,047,551 | 7/1962 | Thomas | 260/94.9 |
| 3,055,880 | 9/1962 | Raecke | 260/94.9 |
| 3,063,798 | 11/1962 | Langer et al. | 260/94.9 |
| 3,121,698 | 2/1964 | Orsino et al. | 260/2.5 |
| 3,216,982 | 11/1965 | Orzechowski et al. | 260/94.9 |
| 3,503,785 | 3/1970 | Kruse | 117/100 B |
| 3,574,138 | 4/1971 | Ziegler et al. | 260/94.9 |
| 3,635,935 | 1/1972 | Long | 260/94.9 |
| 3,681,256 | 8/1972 | Blunt | 260/94.9 |

FOREIGN PATENTS OR APPLICATIONS

| | | | |
|---|---|---|---|
| 747,817 | 12/1966 | Canada | 260/94.9 |
| 818,033 | 8/1959 | United Kingdom | 260/94.9 |

OTHER PUBLICATIONS

Die Makromolecular Chemie–Vol. 121, 1969, pp. 42–50, Keller and Willmouth.

*Primary Examiner*—Melvin Goldstein
*Assistant Examiner*—Edward Woodberry
*Attorney, Agent, or Firm*—Wenderoth, Lind & Ponack

[57] ABSTRACT

A particulate polyolefin is comprised, predominantly, of fibrous unit particles each of a length greater than 200 microns and a diameter less than 1,000 microns, the ratio of the length to diameter being greater than 5, a number of these unit particles having respective cores of fibrous carrier material of a content less than 30 percent by weight in the particle. This polyolefin is produced by catalytic polymerization of an olefin in a polymerization medium containing a Ziegler-type catalyst, a transition metal component of which is prepared by reducing a maximum-valent precursor thereof in the presence of the fibrous carrier material by means of an organometal compound.

24 Claims, 11 Drawing Figures

FIBROUS POLYOLEFIN PARTICLES AND PRODUCTION THEREOF

BACKGROUND

This invention relates generally to polyolefins and more particularly to new particulate polyolefins comprising predominant quantities of fibrous particles and to a process for producing these polyolefins.

The production of olefin polymers by the polymerization or copolymerization of α-olefins through the use of Ziegler-type catalysts (including Ziegler-Natta catalysts), which comprise combinations of transition metal compounds and organometallic compounds, is known. Catalysts comprising combinations of titanium compounds, particularly lower-valence compounds thereof, as the transition metal compounds and organometallic compounds of metals of Groups I, II, and III of the periodic table or these combinations supported on carriers are being preferably used for the polymerization of olefins as ethylene, propylene, and butene-1.

In the production of a polyolefin, the polymerization system is heterogeneous in the relationship between the polymerization medium and the polyolefin produced, and the polyolefin product is obtained in particulate form by separation from a liquid polymerization medium or a gaseous polymerization medium.

A particulate polyolefin produced in this manner is made up of unit particles of irregular shapes which, if anything, are close to spheres and, in most cases, is in an elastomeric state or produced as a mixture of elastomeric particles and resinous particles. For example, in the case where a titanium compound obtained by reducing titanium tetrachloride with an organoaluminum compound is used as one ingredient of a polymerization catalyst, the average particle diameter of the unit particles constituting the resulting polyolefin is large, and the breadth of the diameter distribution is narrow, particles of shapes substantially close to spheres being obtained.

Furthermore, when titanium trichloride catalyst supported on a fibrous carrier is used, short-fiber particles are sometimes observed in minute quantity in the resulting particulate polyolefin, but the overwhelmingly predominant portion of the resin is made up of spherical particles.

A particulate polyolefin made up of unit particles of substantially spherical shape cannot be thought especially to possess inherent effectiveness or advantage arising from the spherical shape of the particles. However, if it were possible to obtain a particulate polyolefin made up of only particles of substantially shortfiber shape, it could be expected that fields of utilization of polyolefins as described below would be developed.

1. Production of synthetic papers by paper-making processes.

As a method of producing synthetic papers wherein polyolefins are used as starting materials, the technique of first melting these materials and then forming films from the molten material without resorting to the conventional papermaking procedure (on a screen) is being developed and reduced to practice.

On the other hand, if the starting-material polyolefin were made up of short-fiber particles, the conventional papermaking technique could be utilized with almost no modification, whereby production of synthetic papers of epochally low prices would become possible. Furthermore, it would be a simple matter to impart to synthetic papers thus produced important properties of papers such as porosity, opacity, and lightness.

2. Production of paper boards by compression without fusion.

Paper boards could be readily produced by compressing without fusion a particulate polyolefin made up of unit short-fiber particles at a temperature below the melting point thereof. Since the unit particles are of short-fiber shape, paper boards of substantially high mechanical strength can be obtained because of the intertwining of these particles. By using a fibrous reinforcing filler at the same time, the strength can be increased even further, whereby a wide range of uses for these polyolefins can be expected.

SUMMARY

It is an object of this invention to provide particulate polyolefins comprising only unit particles of substantially short-fiber shape thereby to realize the above described development of fields of utilization of polyolefins. Another object of this invention is to provide a process for producing such particulate polyolefins.

We have found that these and other objects of this invention can be achieved through the use of specific carrier-supported catalysts as summarized below and described fully hereinafter.

According to this invention in one aspect thereof, briefly summarized, there are provided particulate polyolefins each characteristically defined as:

1. comprising predominantly of unit particles of fibrous state;
2. each of these unit particles of fibrous state having a length greater than 200 microns and a diameter less than 1,000 microns, and the ratio of length to diameter being greater than 5;
3. a number of these unit particles having cores of fibrous carrier material; and
4. the content of this fibrous carrier material within the particulate polyolefin being less than 30 percent by weight.

According to this invention in another aspect thereof, there is provided a process for producing particulate polyolefins of the above defined character wherein an olefin is caused to undergo catalytic polymerization in a polymerization medium containing a catalyst dispersed therein, said catalyst comprising a combination of an organometal compound (B) of a metal in any of Groups I, II, and III of the periodic table and a lower-valent transitional metal compound (A) obtained by reducing a transition metal compound (1) of maximum valence by means of organo-metal compound (2) of a metal of any of Groups I, II, and III of the periodic table, said compound (1) being representable by the general formula $MeX_m(OR)_n$, where: Me is a transition metal of any of Groups IV, V, VI, and VIII of the periodic table; X is a halogen; $m$ and $n$ are zero or a positive integer, $m + n$ being equal to the maximum valence of Me, and $n$ being an integer from zero through 4; and R is a hydrocarbon of from 1 through 8 carbon atoms, said process being characterised in that said transition metal compound (A) is obtained by reducing said compound (1) in the presence of a fibrous carrier material, and said polymerization is continued thereby to produce a particulate polyolefin comprising predominantly constituent unit particles each being of a length greater than 200 and a diameter less than 1,000 microns, the ratio of the length to the diameter being greater than 5.

Thus, in the practice of this invention, a compound (A) of a lower-valent transition metal of substantially the same or similar form as that of the fibrous carrier material used is used as a transition metal component of Ziegler-type catalyst. It is an interesting and important feature of this invention that, through the use of such a compound of a lower-valent transition metal, particulate polyolefins comprising predominantly of fine constituent unit particles of fibrous structure can be obtained.

Moreover, as is indicated by the low content of the fibrous carrier material in the particles according to this invention, a considerable proportion (ordinarily the majority portion) of the unit particles do not contain cores of the fibrous carrier material but are themselves in the form of fine fibers.

The nature, utility, and further features of this invention will be apparent from the following detailed description beginning with a consideration of general aspects and features of the invention and concluding with specific examples of practice illustrating preferred embodiments of the invention, a reference example, comparative examples, and results thereof.

ILLUSTRATIONS

In the illustrations:

These figures are described more fully herein after the examples of the invention.

DETAILED DESCRIPTION

1. Particulate Polyolefin

Polyolefin

The term "polyolefins" is herein used to designate homopolymers and copolymers of α-olefins such as ethylene, propylene, and butene-1 as well as copolymers of these olefins in predominant quantities and ethylenically unsaturated monomers copolymerizable therewith. Examples of such monomers are vinyl esters, acrylic and methacrylic acids, salts and esters thereof, vinyl halides, alkenyl aromatics, vinyl cyanides, and conjugated and non-conjugated polyenes.

Shape

The constituent unit particles of the particulate polyolefins of this invention have lengths over 200 microns, particularly from 500 to 20,000 microns, diameters less than 1,000 microns, particularly from 20 to 500 microns, and ratios of length versus diameter over 5, particularly from 10 to 1,000.

Figure 1:
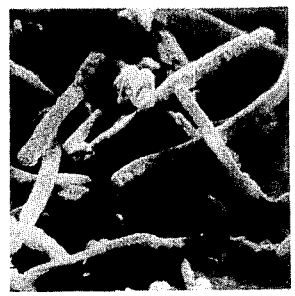
FIGS. 1 through 5 are photomicrographs of examples of particulate polyolefins produced according to this invention.
Figure 2:
Figure 3:
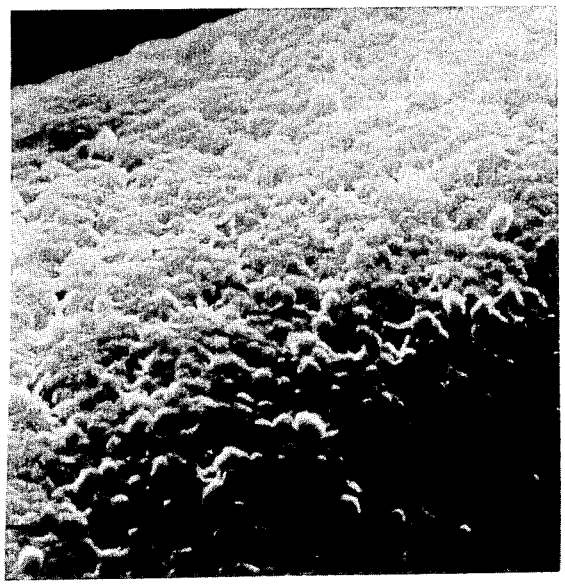
Figure 9:

At least the greater portion of these constituent unit particles normally exist in a separated state, but a number of these particles may be adhering together or in a combined state in some cases. The surfaces of these unit particles are rough and are clearly different from the surfaces of melt-spun fibers, as indicated in FIGS. 1, 2, and 3. That is, whereas the surfaces of melt-spun fibers are smooth as indicated in FIG. 9, the constituent unit fibers according to this invention have a fine porous surface structure resembling a mass of scales as shown in FIG. 3.

A surface structure of this nature is desirable for fibers to be used as paper-making source material. That is, it is possible to cause a hydrophilic substance such as an alcohol, for example, or a surfactant to be adsorbed in the fine pores of the surface, and, as a result, the dispersibility of the fibers in water in the paper-making stage is greatly improved. Consequently, the handling or workability of the material, the uniformity, and the wet strength of the web can be greatly improved. Furthermore, because of the fine porous structure of the fiber surfaces, the points of mutual contact between the fibers are greatly increased, whereby the strength of intertwining between the fibers, that is, the wet strength of the paper, is increased.

A portion of these unit fibers have cores of fibrous carrier material such as asbestos, as described in detail hereinafter. Each of these core-containing particles appears to be a long and slender particle wherein, in general, the thickness of the covering polyolefin layer is greater at its ends than at its lateral sides. The content of the fibrous carrier material within the polyolefin particles according to this invention is less than 30 percent by weight, preferably less than 10 percent by weight, and particularly less than 5 percent by weight.

A considerable part (ordinarily the greater part) of these constituent unit particles do not have cores of the above described character but are made up of the polyolefin itself.

Particles

While the particulate polyolefins of this invention comprise, essentially, unit particles of the above described character, they may contain in addition a stabilizer, a filler, coloring agents, other kinds of resin particles, and other auxiliary materials. Furthermore, chemical modifications such as the introduction of polar vinyl monomer by a graft polymerization procedure are possible.

2. Polymerization

Lower-valent transition metal compound (1)

The most important feature of this invention is that the reduction of the transition metal compound of maximum valence is carried out in the presence of a fibrous carrier material. The product of reduction (A) of the transition metal compound of maximum valence which is insoluble in a hydrocarbon solvent is considered to be in a state of adhesion, impregnation, or some kind of chemical bond on the surface and/or in the interior of the fibrous carrier material. This fibrous product of the reduction reaction is used as the transition metal component of the Zieglertype catalyst according to this invention.

We believe that a lower-valent, transition metal compound in such a fibrous state has heretofore been unknown.

A transition metal compound (1) to be reduced and used in accordance with this invention is a transition metal compound of maximum valence representable by the general formula $MeX_m(OR)_n$ as set forth hereinbefore. Specific examples of suitable metals for Me are zirconium, titanium, vanadium, chromium, molybdenum, tungsten, and iron. Of these, titanium and vanadium are particularly suitable. Examples of suitable halogens for X are chlorine, bromine, and iodine, fluorine also being usable. Specific examples of suitable hydrocarbon groups for R are alkyl, alkenyl, cycloalkyl, phenyl, tolyl, xylyl, and other groups. TiX4 is typical.

The titanium component and compounds usable as source materials thereof as Ziegler-type catalysts are known. In the practice of this invention, also, all compounds representable by the general formula above set forth can be used singly or as mixtures thereof.

For the organic metal compound (2) for reducing the transition metal compound of maximum valence, organometallic compounds of the metals of Groups I, II, and III of the periodic table, in general, are usable. Compounds representable by the following formulas are particularly suitable.

$AlR'_mX_{3-m}$, where: $m$ is 1, 3/2, 2, or 3; $R'$ is a hydrocarbon group of from $C_1$ to $C_6$; and X is a halogen.

$Al(OR')_mX_{3-m}$, where: $m$ is 1, 2, or 3; $R'$ is a hydrocarbon group of $C_1$ $C_6$; and X is a halogen.

$Z_nR'_2$, where: $R'$ is a hydrocarbon group of $C_1$ to $C_6$.

$LiR'$, where $R'$ is a hydrocarbon group of $C_1$ to $C_6$.

The description concerning group R set forth hereinbefore is applicable to group $R'$ in the above formulas.

Specific examples of fibrous carrier materials suitable for coexistence in the reaction of the above defined compounds (1) and (2) are fibrous clay, asbestos, glass fibers, whiskers of metals, intermetallic compounds, and others, pulpfibers, carbon fibers, cellulose, wool, cotton, silk, other natural fibers, and various synthetic fibers. Thus, various material irrespective of classification by their organic, inorganic, natural, and synthetic natures are usable for the fibrous carrier material.

The form, particularly the length and diameter, and quantity of this fibrous carrier material can be freely selected to suit each purpose from points of consideration such as the properties, particularly the shape and strength, of the unit particles constituting the finally obtained particulate polyolefin. However, in general, in order to avoid difficulty in conveying the catalyst in the polymerization process, lengths less than 50 mm., particularly from 0.1 to 10 mm., and diameters less than 0.1 mm. (100 microns), particularly less than 0.05 mm. (50 microns) are desirable.

When the presence of the fibrous carrier material is considered, it is apparent that the reaction of the transition metal compound (1) and the compound of reducing agent (2) can be practically accomplished by any method used in the preparation of the lowervalent titanium compound of the Ziegler-type catalyst. Accordingly, this reaction can be accomplished by mutual contact of these two compounds in the presence or absence of an inert solvent and in an inert atmosphere.

When an inert solvent is used, control of the reaction temperature becomes much easier than that in the case where no solvent is used, and the activity of the resulting catalyst is somewhat higher, but in the polymerization of propylene, the isotacticity becomes somewhat low. Examples of suitable solvents are aliphatic saturated hydrocarbons such as butane, pentane, isopentane, hexane, heptane, octane, and mixtures thereof such as petroleum ether and ligroin. Cyclic hydrocarbons, aromatic hydrocarbons, and halogenated hydrocarbons can be used.

The reduction temperature also has a great effect on the catalyst activity, bulk density, and isotacticity.

While the suitable reduction temperature differs with the reducing capacity of the organometallic compound used for the reducing agent, it is generally in the range of the order of from $-100°C$ to $+100°C$. When an agent of high reducing capacity such as $AlEt_3$ is used, a temperature in the range of from $-100°C$ to approximately $+10°C$ is desirable in order to prevent unnecessary over-reduction, while when an agent of relatively low reducing capacity such as $AlEtCl_2$ is used, a temperature in the range of from $-10°C$ to approximately $+100°C$ is desirable.

The reduction product thus obtained is a solid product of brown, purple, or black color and, in accordance with the quantity and kind of the fibrous carrier material, assumes various forms ranging from that wherein substantially all of the product is fibrous to that wherein a considerable quantity of non-fibrous substances are present.

Various modifications can be made with respect to the reaction of the transition metal compound (1) of maximum valence and the compound of reducing agent (1) and to the resulting reaction product.

For example, in order to increase the catalytic activity of the olefin polymerization or in order to increase the stereospecificity of the resulting polyolefin, various compounds can be added during or prior to and/or after the reduction of the transition metal compound of maximum-valence by the organometallic compound to the transition metal compound and/or the organometallic compound or to the product of reaction of both compounds.

One example of such a compound is compound representable by the general formula $CX_nY_{4-n}$ or $SiX_nY_{4-n}$, wherein X is a halogen, Y is hydrogen, an alkyl group, or an alkoxyl group, and n is an integer from zero through 4. Specific examples of such a compound are carbon tetrachloride, chloroform, bromoform, iodoform, silicon tetrachloride, trichlorosilane, methylchlorosilane, ethyltrichlorosilane, dichloromethylsilane, dichlorodimethylsilane, chlorotrimethylsilane, tetramethylsilane, diethoxydimethylsilane, and methylethoxysilane, which can be used singly or as mixtures thereof.

The reaction product thus-obtained is subjected to washing and/or heat treatment. More specifically, in the stereospecific polymerization of an $\alpha$-olefin such as propylene, the presence of a specific organometallic compound such as, for example, alkylaluminum dichloride, is not desirable in many cases. Therefore, when a deleterious compound of this character has been formed as a by-product depending on the kind of reducing agent (2) used, it is preferable to deaerate the slurry of the reduction product and to wash away this deleterious compound with a fresh and thoroughly dried inert solvent.

In some cases, furthermore, in order to improve the performance of this catalyst component (A) containing a lower-valent transition metal, that is, in order to increase the polymer yield per unit weight of the lower-valent transition metal compound and to increase the content of the crystalline polymer, this solid product is thoroughly washed and then subjected to a heat treatment, whereupon a desirable result is attained. A suitable temperature for this heat treatment is in the range of from 60° to 200°C, preferably from 110° to 170°C. The heat treatment time is at least one hour.

Polymerization

Except for the use of the solid catalyst component (A) containing a transition metal according to this invention as described above in the polymerization, the polymerization process of this invention does not differ, essentially, for that ordinarily used for polymerizations of this kind.

An example of a class of organometallic compounds of metals of Groups I, II, and III of the periodic table to be used together with the above mentioned compound (A) is an organo-aluminum compound representable by the general formula $AlR_nX_{3-n}$, where: R is a hydrocarbon residue such as alkyl, aryl, aralkyl, alkaryl, and cycloalkyl, particularly lower ($C_1$ to $C_6$) alkyl groups such as ethyl, propyl, and butyl groups; X is a halogen, particularly chlorine; and $n$ is 1, 3/2, 2, or 3. Specific examples are triethylaluminum, diethylaluminum chloride, ethylaluminum dichloride, ethylaluminum sesquichloride, di-n-propylaluminum chloride, and diisobutylaluminum chloride.

As a third component of the catalyst, a suitable quantity of any of various electron-donor compound can be used at the same time, whereby advantageous effects such as improvements in the polymerization activity and the stereospecificity are expected.

The polymerization temperature is from room temperature to 110°C, preferably from 50° to 90°C. One possible "polymerization medium" is a liquid-phase medium. When a liquid-phase medium is used, the process is a so-called slurry polymerization, and an inert organic solvent in which the resulting polyolefin is insoluble (for example, aliphatic saturated hydrocarbons such as butane, pentane, isopentane, hexane, and octane, cyclic hydrocarbons such as cyclopentane, cyclohexane, and methylcyclohexane, and aromatic hydrocarbons such as benzene, toluene, and xylene) or the monomer to be polymerized, itself, can be used as a liquid-phase polymerization medium.

Another kind of polymerization medium is a gas-phase medium, and through its use a so-called gas-phase polymerization without solvent is carried out. By this process, a higher yield per unit quantity of the catalyst can be attained than by the slurry polymerization process, and the length of the fibrous unit particles formed can be increased. Furthermore, the ash content of the product can be decreased to an extent whereby removal of the catalyst becomes unnecessary, and agitation is easily accomplished in spite of the low bulk density.

In either case, hydrogen or some other molecular weight modifier can be used.

The starting material olefins suitable for use in this polymerization are as defined hereinbefore.

In order to indicate still more fully the nature, utility, and further features of this invention, the following specific examples of practice constituting preferred embodiments of the invention and results are set forth, it being understood that these examples are presented as illustrative only, and that they are not intended to limit the scope of the invention.

EXAMPLE 1

1. Preparation of titanium trichloride

A three-neck flask of a capacity of 1 liter was purged with nitrogen and then charged with 5 grams (g.) of asbestos (approximately one-tenth mm. × one-tenth micron) sold on the market for Gooch crucibles, 26.1 cc. of titanium tetrachloride, and 7 cc. of silicon tetrachloride. The resulting solution was cooled to 0°C. Into this solution thus cooled, 28 g. of $AlEt_2Cl$ dissolved in 100 cc. of normal heptane was dropped at a steady rate within 4 hours as the solution was agitated at a rotational speed of 200 rpm.

Thereafter, the agitation was continued for a further 3 hours at zero degress C in order to complete the reduction, whereupon a fine, brown precipitate was formed. This precipitate was then washed by first leaving the resulting mother liquid at settling for a period, and then washing the precipitate three times with 300 cc. of normal heptane. This solid product was then heated for 2 hours at 155°C. Thus, 50 g. of a purple solid product containing $TiCl_3$ as its principal constituent and carried on the absetos short fibers, which was added initially, was obtained.

2. Polymerization of propylene

A 3-liter, stainless-steel autoclave having an agitation rod and a temperature controlling device was purged by several cycles of alternate evacuation and flushing with propylene and was then charged with 1,500 cc. of heptane, 2.0 g. of $AlEt_2Cl$, and 1.0 g. of titanium trichloride produced as set forth in part (1) above. Hydrogen in a quantity of 200 cc., was calculated on the basis of room temperature and standard atmospheric pressure, was then introduced into the autoclave. The temperature of the autoclave was raised to 65°C, and then, as propylene was supplied into the autoclave at a rate such that the pressure therein was maintained constant at 6 kg./cm², polymerization was carried out for 5 hours.

Upon completion of the polymerization, 200 cc. of butanol was added to the process material within the autoclave, and the resulting batch was treated at 70°C for 2 hours. Upon completion of this treatment, the resulting polymer slurry was filtered, and the polymer cake thus obtained was dried under vacuum at 70°C for 6 hours.

As a result, 275 g. of a white, solid polymer was obtained. This polymer was found to be made up entirely of particles in the form of short fibers, each of a length of the order of 2 mm. and a diameter of the order of 10 microns.

3. Microscopic examination of the fibrous constituent units

A portion of the particulate polypropylene thus obtained was first examined at room temperature by means of an optical microscope provided with a heater, whereupon it was found to consist of only particles in the form of short fibers comprising large particles of 2.2mm. length and 40-micron diameter and small particles of 300-micron length and 20-micron diameter.

Next, the polymer particles under examination were heated by means of the heater, whereupon the polymer was observed to melt completely at a temperature in the vicinity of 175°C. Asbestos fibers of 220-micron length and 5-micron diameter were observed in only the longest unit particles, but asbestos was not observable in the other fibrous particles. From these observations, the following points are apparent.

a. The fibrous unit particles comprise particles possessing nucleuses or cores and also particles not possessing such nucleuses or cores. In the case of this example, the overwhelming majority of the particles lacked cores, but this is to be expected in view of the quantity of asbestos in the catalyst and the yeild of the polymer per unit quantity of the catalyst.

b. In a polymer particle having a core, the growth in the lengthwise direction with respect to the core is remarkably greater than the growth in the diametric direction.

In the case of this example, the growth in the lengthwise direction was 2 mm. (= 2.2m. − 220 microns), and the growth in the diametric direction was 35 microns (= 40 microns − 5 microns).

Example 2

1. Preparation of titanium trichloride

The procedure set forth in part 1 of Example 1 was followed except for the use of 20 g. of asbestos for Gooch crucibles to prepare titanium trichloride, whereupon 65 g. of a purple solid product containing $TiCl_3$ as its principal constituent carried on short asbestos fibers was obtained.

2. Polymerization of propylene

A stainless steel autoclave having a capacity of 8 liters and provided with an agitation rod and a temperature controlling device was purged by several cycles of alternate evacuation and flushing with propylene and was then charged with 4.0 g. of $AlEt_2Cl$, 0.926 g. of the titanium chloride produced as described in part (1) above, and 1.4 liters of liquefied propylene. The temperature of the autoclave was raised to 45°C, and agitation of the batch was carried out for 55 minutes. At the end of this period, all of the liquefied propylene had been consumed in the polymerization, and the residual propylene was found to be existing in the system only as a gas. The process temperature was then raised to 70°C, and polymerization was carried out in a gaseous state under a pressure of 25 kg/cm$^2$ G for a further 50 minutes.

Upon completion of polymerization, 620 g. of polymer was obtained and found to consist entirely of particles in the form of short fibers of a length of the order of 5 mm. and a diameter of the order of 40 microns.

Example 3

1. Preparation of titanium trichloride

The procedure of part (1) of Example 1 was followed except for the use of 45 g. of asbestos fibers cut to a uniform length of approximately 1 cm. to prepare titanium trichloride, whereupon 87 g. of a purple solid product containing $TiCl_3$ as its principal ingredient and carried on asbestos fibers was obtained.

2. Polymerization of propylene

The interior of the same autoclave as that used in Example 2 was purged with propylene and was then charged with 4.0 g. of $AlEt_2Cl$, 2.025 g. of the titanium trichloride prepared by the procedure of part (1) above, and 10 g. of polypropylene prepared beforehand and consisting of only fibrous particles. These process materials were subjected for 3 hours to gas-phase polymerization at 70°C and under a pressure of 25 kg./cm$^2$G.

Upon completion of the polymerization, 854 g. of a polymer was obtained. This polymer was found to comprise particles which were all of short fiber form and were of lengths of from 1 to 2 cm. and diameters of the order of from 50 to 70 microns.

Example 4

1. Preparation of titanium trichloride

Glass fibers the surfaces of which had been treated with γ-methacryloxypropyltrimethoxysilane were cut to a uniform length of approximately 5 mm. Titanium trichloride was prepared under the conditions specified in Example 1 except for the use of 20 g. of these glass fibers in individually separated state as a carrier. Thus, 63 g. of a purple, solid product containing $TiCl_3$ as its principal constituent and carried on glass fibers was obtained.

2. Polymerization of propylene

Polymerization of propylene was carried out with the apparatus and under the polymerization conditions set forth in Example 2 except for the use of 1.0 g. of the titanium trichloride prepared according to part (1) above.

As a result, 710 g. of a white, solid polymer was obtained. This polymer was found to be made up entirely of particles in the form of short fibers of lengths of from 5 to 8 mm. and diameters of the order of from 30 to 50 microns.

Example 5

1. Preparation of titanium trichloride

Titanium trichloride was prepared under the conditions specified in Example 1 except for the use of 1 g. of pulp in the form of short fibers of lengths of approximately 5 mm. as a carrier. In this manner, 60 g. of a purple, solid product containing $TiCl_3$ as its principal constituent and carried on the pulp was obtained.

2. Polymerization of propylene

Polymerization of propylene and after-treatment were carried out under the conditions set forth in Example 1 except for the use of 1.1 g. of titanium trichloride prepared in the manner described in part (1) above.

As a result, 243g of a white, solid polymer was obtained. This polymer was found to be made up entirely of particles in the form of short fibers of lengths of approximately 10 mm. and diameters of the order of 50 microns.

Example 6.

An autoclave as specified in Example 1 was purged by several repeated cycles of alternate evacuation and flushing with ethylene and was then charged with 1,500 cc. of heptane, 2.0 g. of $AlEt_2Cl$, and 1.28 g. of the titanium prepared according to part (1) of Example 1, and 200 cc., as calculated on the basis of room temperature and standard atmospheric pressure, of hydrogen was introduced into the autoclave. The temperature within the autoclave was raised to 60°C, and then, as ethylene was supplied into the autoclave to being the pressure therein to a constant value of 6 kg./cm$^2$ G, polymerization was carried out for 5 hours.

The resulting process material was treated in the manner set forth in Example 1, whereupon 164 g. of a white, solid polymer was obtained. This polymer was found to consist entirely of particles in the form of short fibers of lengths of the order of 1.5 mm. and diameters of the order of 10 microns.

Example 7

The autoclave specified in Example 1 was purged by repeated cycles of alternate evacuation and flushing with propylene and then charged with 1,500 cc. of heptane, 2.0 g. of $AlEt_2Cl$, and 1.21 g. of the titanium trichloride prepared in accordance with part (1) of Example 1. 200 cc., on the basis of room temperature and standard atmospheric pressure, of hydrogen was introduced in the autoclave, the interior temperature of which was then raised to 60°C. Then, as propylene was supplied to maintain the autoclave at a constant pressure of 1 kg./cm$^2$G, preliminary polymerization was carried out for 10 minutes.

Next, propylene was purged out to reduce the pressure of the autoclave to 0 kg./cm$^2$G and then pressurized to 6 kg/cm$^2$G with a propylene-ethylene gas mixture containing 3.0 percent by weight of ethylene, and the polymerization was continued for 5 hours at 60°C. Upon completion of the polymerization, the resulting process material was treated in the manner described in Example 1.

As a result, 291 g. of a white, solid polymer was obtained. This polymer was found to consist entirely of particles in the form of short fibers of lengths of approximately 2 mm. and diameters of the order of 10 microns.

Example 8

1. Preparation of titanium trichloride

The procedure of part (1) of Example 1 was followed except for the use of 5g of cotton cut to a uniform length of approximately 3 mm to prepare titanium teichloride, whereupon 43 g of a purple solid product containing TiCl$_3$ as its principal ingredient and carried on cotton fibers was obtained.

2. Polymerization of propylene

The procedure of part (2) of Example 1 was followed except for the use of 1.0 g. of titanium trichloride prepared by the procedure of part (1) above, and 240 g of white solid polymer was obtained.

This polymer was formed to comprise particles which were all of short fiber form were of lengths of from 5 to 7 mm and diameters of the order of from 30 to 50 microns.

Example 9

1. Preparation of titanium trichloride

The procedure of part (1) of Example 1 was followed except for the use of 30 g of kaolin fibers ("Kaowool") cut to a uniform length of approximately 3 mm to prepare titanium trichloride, whereupon 71 g of a purple solid product containing TiCl$_3$ as its principal ingredient and carried on the ceramic fibers was obtained.

2. Polymerization of propylene

The procedure of part (2) of Example 1 was followed except for the use of 1.0 g of titanium trichloride prepared by the procedure of part (1) above, and 450 g of white solid polymer was obtained.

This polymer was formed to comprise particles which were all of short fiber form and were of lengths of from 3 to 5 mm and diameters of the order of from 30 to 60 microns.

Reference Example

In order to investigate the suitability of particulate polyolefins comprising fibrous unit particles for use as a starting material for synthetic paper produced by the paper-making (scooping) process, the following experiments were carried out.

1. An excessive quantity of ethyl alcohol was added under stirring to the polymer obtained by the procedure of part (1), and the resulting mixture was subjected to centrifugal separation.

200 g. of fine fibers of a length of 2.2 mm. and a diameter of 40 microns obtained in this manner and bearing ethyl alcohol adsorbed in fine pores on their surfaces were dispersed in 2 liters of water containing an EPT* emulsion as an adhesive as this water was agitated. This emulsion was previously prepared by dispersing 5.0g. of EPT, together with 10g. of an emulsifier, in 100 g. of water.

* Ethylene-Propylene-Terpolymer rubber

Thereafter, the resulting dispersion was subjected to a hand papermaking scooping process, whereupon a uniform web of a thickness of 200 microns (± 10 percent deviation) was obtained. The wet strength of this web was 30 g. in terms of falling ball impact resistance, which indicates that the web can fully withstand use in a papermaking process. This falling ball impact resistance was measured by dropping a ball of 1-cm. radius from a height of 20 cm. onto a circular piece of the web of an area of 14 cm$^2$, and the result was the minimum weight of the ball required to rupture the web.

2. 200 g. of polypropylene fibers of 40-micron diameter obtained by a melt-drawing process and cut to a length of 2.2 mm. was dispersed in 2 liters of water to which and EPT emulsion had been added, similarly as in part (1) above, as the water was agitated. However, the floating velocity of the fibers was very high, whereby a uniform dispersion could not be obtained.

With the dispersion in this state, a web of an average thickness of 200 microns was produced therefrom by means of a hand papermaking scooping machine. This web had a very large deviation of ±50 percent in its thickness, and its falling ball impact strength also was a mere 10 g., which indicated that this web cannot withstand a papermaking process.

Comparison Examples 1, 2, and 3

The following experiments were carried out to obtain polyolefins in the form of short fibers by causing beforehand the catalyst titanium trichloride and a carrier to react at the time of catalyst preparation without supporting the catalyst component of titanium trichloride on a fibrous carrier and then causing reaction of the resulting material with the olefins.

The autoclave specified in Example 1 was thoroughly purged with propylene and then charged with 1,500 cc. of heptane, 0.5g. (Case a), 5 g. (Case b), and 20g. (Case c) of the asbestos for Gooch crucibles used in Example 1, and 1.0 g. of titanium trichloride which had been prepared by reduction of TiCl$_4$ with metal aluminum and then subjected to pulverization treatment. These materials were agitated for 10 minutes. Next, 2.0 g. of AlEt$_2$Cl was added thereto, and the interior temperature of the autoclave was raised to 65°C, at which temperature propylene was introduced to maintain the pressure at 4 kg./cm$^2$G and polymerization was carried out for 2 hours.

Upon completion of this polymerization, the resulting process material was subjected to the treatment set forth in Example 1, whereupon white, solid polymers in quantities of 311 g. (case a), 233 g. (Case b), and 144 g. (Case c) in accordance with the quantities used of the asbestos for Gooch crucibles. The characteristics of these polymers were as follows.

(Case a). Substantially all of the particles were nearly spherical in shape, and unit particles in the form of short fibers were almost nonexistent, being less than one percent.

(Case b.) While a very small quantity of less than 10 percent of unit particles in the form of short fibers of approximately 2-mm. length and 20-micron diameter were present, the overwhelming majority of the particles were of spherical shape.

(Case c). Approximately 20 percent of the particles were of short fiber shape, while most of the particles were spherical. The short fibers were of lengths of less than 0.1 mm. and diameter of the order of 10 microns.

Comparison Examples 4 through 7

The autoclave specified in Example 1 was thoroughly purged with propylene and then charged with 1,500 cc. of heptane, 0.5 g. (Case a), 5 g. (Case b), 50g. (Case c), and 100 g. (Case d) of the asbestos for Gooch crucibles used in Example 1, and 5.0 g. of $TiCl_4$, which materials were agitated for 10 minutes. Next, 10.0 g. of $AlEt_3$ was added to these materials. Then, after the interior temperature of the autoclave was raised to 65°C, propylene was introduced thereinto to maintain the autoclave pressure at 6 kg./cm$^2$, and polymerization was thus carried out for 5 hours.

Upon completion of the polymerization, the resulting material was treated in the manner set forth in Example 1. As a result, white solid polymers in quantities of 306 g. (Case a), 92.2 g. (Case b), and 147g. (Case c) were obtained. A microscopic examination of these ploymers (case a, b, and c) indicated that they consisted substantially of only particles in the shapes of lumps of diameters of from 1 mm. to 1 cm. It was found that when these polymers have melted, they contained countless fibers of the carrier asbestos. However, the directionality of the carrier asbestos was not uniform. Moreover, the polymers themselves did not form fibers.

A microscopic examination of the polymer of Case d revealed that it consisted essentially of only the added asbestos and was distributed between the asbestos fibers without forming any distinct polymer fibers.

Comparison Example 8

1. In a flash purged with nitrogen, a mixture of 4.8 g. of $TiCl_4$ and 20 g. of asbestos for Gooch crucibles specified in Example 1 was prepared.

2. In a separate flask similarly purged with nitrogen, a mixture of Al $Et_3$ in a quantity corresponding to 3.9 g. of a 20-percent solution thereof in heptane and 20 g. of asbestos for Gooch crucibles was prepared.

An autoclave as specified in Example 1 except for the provision therein of ribbon vanes of helical type was thoroughly purged with propylene and then charged with all of the mixture prepared in the manner described in paragraph (1) above. Next, the interior temperature of the autoclave was raised to 75°C, at which the entire quantity of the mixture prepared according to paragraph (2) above was supplied into the autoclave. Then, as propylene was supplied thereinto to maintain the pressure therein constant at 5 kg/cm$^2$, polymerization was carried out at 75°C. for 1.5 hours.

Upon completion of this polymerization, the resulting material was taken directly out of the autoclave, whereupon 134 g. of a gray-white polymer (containing asbestos) was obtained. This polymer consisted essentially of only lumps of diameters ranging from 1 to 5 mm., and no fibrous substances were produced. Upon examining this polymer through a microscope, it was found that, while a large number of asbestos fibers supplied together with a catalyst could be observed within the polymer, they were disposed without directionality.

The accompanying illustrations will now be described more fully with respect to the foregoing description.

FIG. 1 is a photomicrograph of the particulate polypropylene produced in accordance with Example 1 as magnified 150 times at room temperature by an optical microscope. FIG. 2 is a photomicrograph of the same object magnified further 500 times.

FIG. 3 is a photomicrograph of the same object magnified further and showing the surface of the particles produced according to this invention. This view of 10,000 × magnification of the original object clearly shows a surface with convexities and concavities, differing from the surface of the melt-stretched material shown in FIG. 9.

Figure 4:
Figure 5:

FIGS. 4 and 5 are contiguously adjoining photomicrographs of a particle of the polymer of the invention produced in accordance with Example 1 as magnified 50 times at room temperature by an optical microscope. An extremely long particle is clearly observable among the particles.

Figure 6:
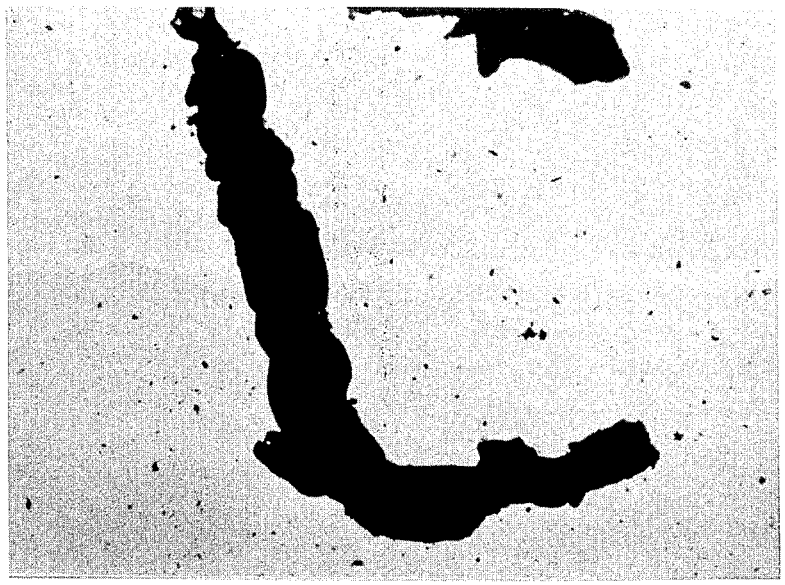
FIGS. 6 and 7 are photomicrographs showing states of change of particles at the time when these particles of polyolefins produced according to the invention are melted.
Figure 7:
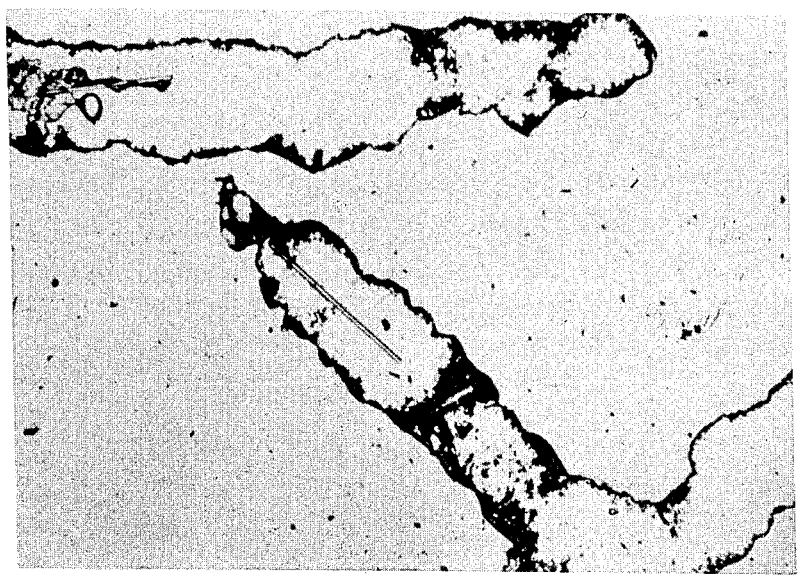

FIG. 6 is a photomicrograph of 50 × magnification showing another particulate polymer produced in accordance with the invention. When this polymer was heated and melted at 160°C. it appeared as shown in FIG. 7. The two objects appearing as two straight lines in the center and upper left of FIG. 7 are glass fiber nucleuses present among the particles.

Figure 8:
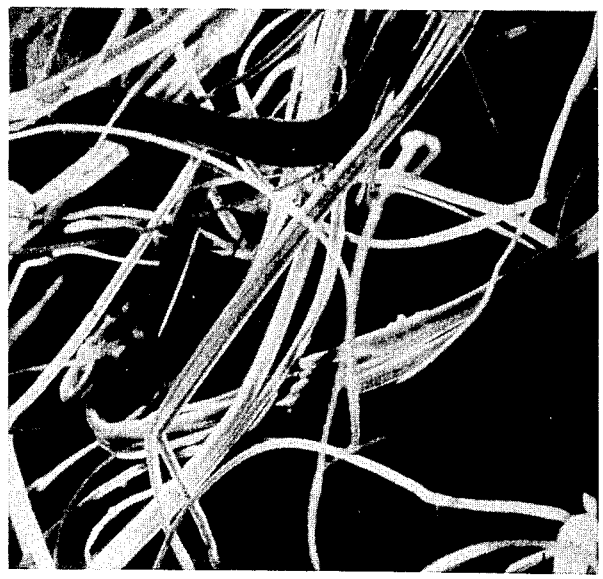
FIGS. 8 and 9 are photomicrographs of examples of polyolefin fibers melt stretched by a known method.

FIG. 8 is a photomicrograph of a polypropylene sold on the market and melt-stretched, the magnification being 100 times by an optical microscope. FIG. 9 is a photomicrograph of 3,000 × magnification of the same object as in FIG. 8. The surface structure of this material is clearly different from that of the polymers produced according to this invention.

Figure 10:
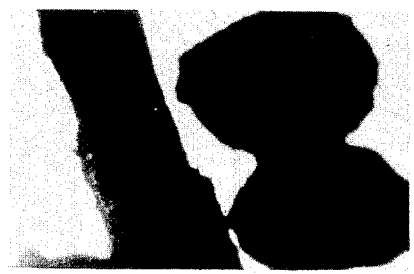
FIGS. 10 and 11 are photomicrographs of carrier-containing polyolefins obtained by a known method.
Figure 11:

FIG. 10 is a photomicrograph of 50 × magnification showing a polyolefin containing a carrier and produced by the procedure of Comparison Example 5. This view clearly shows a large number of asbestos fibers constituting a carrier admixed within the polymer. When this polymer was heated and melted at 190°C, it assumed an appearance as shown in FIG. 11, containing a large quantity of asbestos. The surface appearance of this polymer is also clearly indicated as differing from that of the polymers according to this invention.

What is claimed is:

1. A particulate polyolefin comprising, predominantly, constituent unit particles of fibrous character each being of a length greater than 200 microns and a diameter less than 1,000 microns, the ratio of the length of diameter being greater than 5, minor proportion of the unit particles respectively having cores of fibrous carrier material therein, the content of which within the polyolefin is less than 30 percent by weight.

2. A particulate polyolefin as claimed in claim 1 in which said polyolefin is selected from the group consisting of homopolymers of ethylene, propylene, butene-1, and pentene-1; copolymers of at least two monomers selected from the group consisting of ethylene, propylene, butene-1, and pentene-1; copolymers of predominant amount of at least one monomer selected from the group consisting of ethylene, propylene, butene-1, and pentene-1 with at least one ethylenically unsaturated monomer other than said olefins.

3. A particulate polyolefin as claimed in claim 2 in which said polyolefin is selected from the group consisting of homopolymers of ethylene and of propylene, copolymers of ethylene and propylene.

4. A particulate polyolefins as claimed in claim 1 in which each of said unit particles is of a length of 500 $\mu$ to 20,000 $\mu$, and a diameter of 20 $\mu$ to 500 $\mu$, the ratio of the length to diameter being 10 to 1,000.

5. A particulate polyolefin as claimed in claim 1 in which said fibrous carrier material is of a length less than 50 mm and a diameter less than 0.1 mm.

6. A particulate polyolefin as claimed in claim 5 in which said fibrous carrier material is of a length of 0.1 to 10 mm and a diameter less than 0.05 mm.

7. A process for producing particulate polyolefins wherein an olefin is caused to undergo catalytic polymerization in a polymerization medium containing a catalyst dispersed therein, said catalyst comprising a combination of an organometal compound (B) of a metal in any of Groups I, II, and III of the periodic table and a lower-valent transition metal compound (A) obtained by reducing a transition metal compound (1) of maximum valence by means of an organo-metal compound (2) of a metal or any of Groups I, II, and III of the periodic table, said compound (1) being representable by the general formula $MeX_m(OR)_n$, where: Me is a transition metal of any of Groups IV, V, VI, and VIII of the periodic table; X is a halogen; $m$ and $n$ are zero or a positive integer, $m+n$ being equal to the maximum valence of Me, and $n$ being an integer from zero through 4; and R is a hydrocarbon of from 1 through 8 carbon atoms, said process being characterised in that said transition metal compound (A) is obtained by reducing said compound (1) in the presence of a fibrous carrier material with subsequent washing or heat treatment or a combination of these washing and heat-treatment steps, and said polymerization is continued thereby to produce a particulate polyolefin comprising predominantly constituent unit particles of fibrous character each being of a length greater than 200 microns and a diameter less than 1,000 microns, the ratio of the length to the diameter being greater than 5, a minor proportion of the unit particles having cores of fibrous carrier material therein, the content of which within the polyolefin is less than 30 percent by weight.

8. A process for producing particulate polyolefins as claimed in claim 7 in which said olefin is at least one member selected from the group consisting ethylene, popylene, butene-1, and pentene-1.

9. A process for producing particulate polyolefins as claimed in claim 8 in which said olefin is selected from the group consisting of ethylene, propylene, and mixtures thereof.

10. A process for producing particulate polyolefins as claimed in claim 8 in which said olefin is in admixture with a minor amount of an ethylenically unsaturated monomer other than said olefin.

11. A process for producing particulate polyolefins as claimed in claim 7 in which said polymerization medium is liquid.

12. A process for producing particulate polyolefins as claimed in claim 7 said polymerization medium is gaseous.

13. A process for producing particulate polyolefins as claimed in claim 7 in which said metal Me is titanium, and X is chlorine.

14. A process for producing particulate polyolefins as claimed in claim 7 in which said compound (1) is a titanium tetrahalide.

15. A process for producing particulate polyolefins as claimed in claim 14 in which said titanium tetrahalide is titanium tetrachloride.

16. A process for producing particulate polyolefins as claimed in claim 7 in which said compound (B) is an organoaluminum compound representable by the general formula $AlR'_mX_{3-m}$ where $m$ is 1, 1.5, 2 or 3, R is a hydrocarbon group of 1 to 6 carbon atoms, and X is a halogen.

17. A process for producing particulate polyolefins as claimed in claim 16 in which said halogen is chlorine.

18. A process for producing particulate polyolefins as claimed in claim 7 in which said compound (2) is an organoaluminum compound representable by the general formula $AlR'_mX_{3-m}$ where $m$ is 1, 1.5, 2 to 3, R is a hydrocarbon atoms, and X is a halogen.

19. A process for producing particulate polyolefins as claimed in claim 7 in which said fibrous carrier material is of a length less than 50 mm and a diameter less than 0.1 mm.

20. A process for producing particulate polyolefins as claimed in claim 19 in which said fibrous carrier material is of a length of 0.1 to 10 mm and a diameter less than 0.05 mm.

21. A process for producing particulate polyolefins as claimed in claim 7 in which said compound (A) is obtained by reducing said compound (1) which has impregnated said fibrous carrier material.

22. A particulate polyolefin as in claim 1 in which said fibrous carrier material is asbestos.

23. A particulate polyolefin as in claim 1 in which said fibrous carrier material is selected from the group consisting of fibrous clay, asbestos and glass fibers.

24. A process for producing particulate polyolefin as claimed in claim 7 in which the fibrous carrier material is selected from the group consisting of fibrous clay, asbestos, and glass fibers.

* * * * *